United States Patent
Sherman et al.

(10) Patent No.: US 11,557,916 B2
(45) Date of Patent: Jan. 17, 2023

(54) WIRELESS POWER TRANSFER FOR A PHOTOVOLTAIC POWER SOURCE

(71) Applicant: POWERMAT TECHNOLOGIES LTD, Petach Tikva (IL)

(72) Inventors: Itay Sherman, Hod Hasharon (IL); Elieser Mach, Rosh Tzurim (IL); Neri Naveh, Kiryat Ono (IL)

(73) Assignee: POWERMAT TECHNOLOGIES LTD., Petach Tikva (IL)

( * ) Notice: Subject to any disclaimer, the term of this patent is extended or adjusted under 35 U.S.C. 154(b) by 0 days.

(21) Appl. No.: 17/542,707

(22) Filed: Dec. 6, 2021

(65) Prior Publication Data

US 2022/0190630 A1     Jun. 16, 2022

Related U.S. Application Data

(60) Provisional application No. 63/123,659, filed on Dec. 10, 2020.

(51) Int. Cl.

| | | |
|---|---|---|
| *H02J 7/35* | (2006.01) | |
| *H02J 3/38* | (2006.01) | |
| *H02J 50/10* | (2016.01) | |
| *G05F 1/67* | (2006.01) | |

(52) U.S. Cl.
CPC .............. *H02J 7/35* (2013.01); *G05F 1/67* (2013.01); *H02J 3/381* (2013.01); *H02J 50/10* (2016.02); *H02J 2300/26* (2020.01)

(58) Field of Classification Search
CPC .... H02J 7/35; H02J 50/10; H02J 3/381; H02J 3/38; H02J 2300/26; G05F 1/67
See application file for complete search history.

(56) References Cited

U.S. PATENT DOCUMENTS

| | | |
|---|---|---|
| 10,128,660 B1 | 11/2018 | Apte et al. |
| 2012/0098350 A1 | 4/2012 | Campanella et al. |
| 2014/0132210 A1 | 5/2014 | Partovi |
| 2015/0333622 A1 | 11/2015 | Peters et al. |

FOREIGN PATENT DOCUMENTS

| | | |
|---|---|---|
| EP | 2985863 A1 | 2/2016 |

OTHER PUBLICATIONS

European Search Report for Application No. EP 21 21 3762 dated May 12, 2022.

*Primary Examiner* — Robert L Deberadinis
(74) *Attorney, Agent, or Firm* — Volpe Koenig

(57) ABSTRACT

A wireless photovoltaic power system is provided. The wireless photovoltaic power system includes photovoltaic cell units that provide power. Each of the photovoltaic cell units include a photovoltaic cell. The wireless photovoltaic power system includes a first wireless power device that receives the power. The first wireless power device includes a coil that provides a magnetic field to wirelessly transfer the power to a second wireless power device. The first wireless power device provides a combinational implementation of a maximum power point tracking of the photovoltaic cell units and a power control of a load.

14 Claims, 6 Drawing Sheets

WIRELESS POWER TRANSFER FOR A PHOTOVOLTAIC POWER SOURCE

CROSS REFERENCE TO RELATED APPLICATIONS

This application claims priority from U.S. Provisional Patent Application No. 63/123,659, entitled "INNOVATIVE SYSTEM COMBINES PHOTOVALTAIC POWER SOURCE," filed on Dec. 10, 2020, which is hereby incorporated by reference as if set forth in full in this application for all purposes.

BACKGROUND

The disclosure relates generally to wireless photovoltaic (PV) power systems, and more specifically, to wireless power transfer for a PV power source.

Generally, PV power sources are electronic devices that produce electric current at a junction of two substances exposed to light (i.e., convert light into electricity). PV power sources can be unstable due to inconsistencies of light, which has contributed to a lack of wireless power designs that use PV power sources.

Thus, there is a need for a wireless PV power systems.

SUMMARY

According to one or more embodiments, a wireless photovoltaic power system is provided. The wireless photovoltaic power system includes one or more photovoltaic cell units that provide power. Each of the one or more photovoltaic cell units include a photovoltaic cell. The wireless photovoltaic power system includes a first wireless power device that receives the power. The first wireless power device includes a coil that provides a magnetic field to wirelessly transfer the power to a second wireless power device. The first wireless power device provides a combinational implementation of a maximum power point tracking of the one or more photovoltaic cell units and a power control of a load.

According to one or more embodiments, the above wireless photovoltaic power system can be implemented as a method, an apparatus, and/or a computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Embodiments disclosed herein may include apparatuses, systems, methods, and/or computer program products (e.g., a wireless PV power system) that wirelessly transfers power of a PV power source. By way of example, one or more embodiments of the wireless PV power system can combine one or more PV power sources or PV cells with wireless power charging to energize a battery.

One or more technical effects, advantages, and benefits of the wireless PV power system include enabling maximum power point tracking (MPPT) of the one or more PV cells and/or implementing optimal constant current constant voltage (CCCV) charging for one or more batteries using minimal hardware. The wireless PV power system can also transfer energy stored in the one or more batteries to a consuming device, which may also be wirelessly coupled or uncoupled from the one or more PV cell. Further, one or more embodiments of the wireless PV power system include connecting multiple PV cells to a single wireless power transmitter, while an optimal MPPT is individually performed for each of the multiple PV cell, with minimal hardware overhead.

Figure 1:
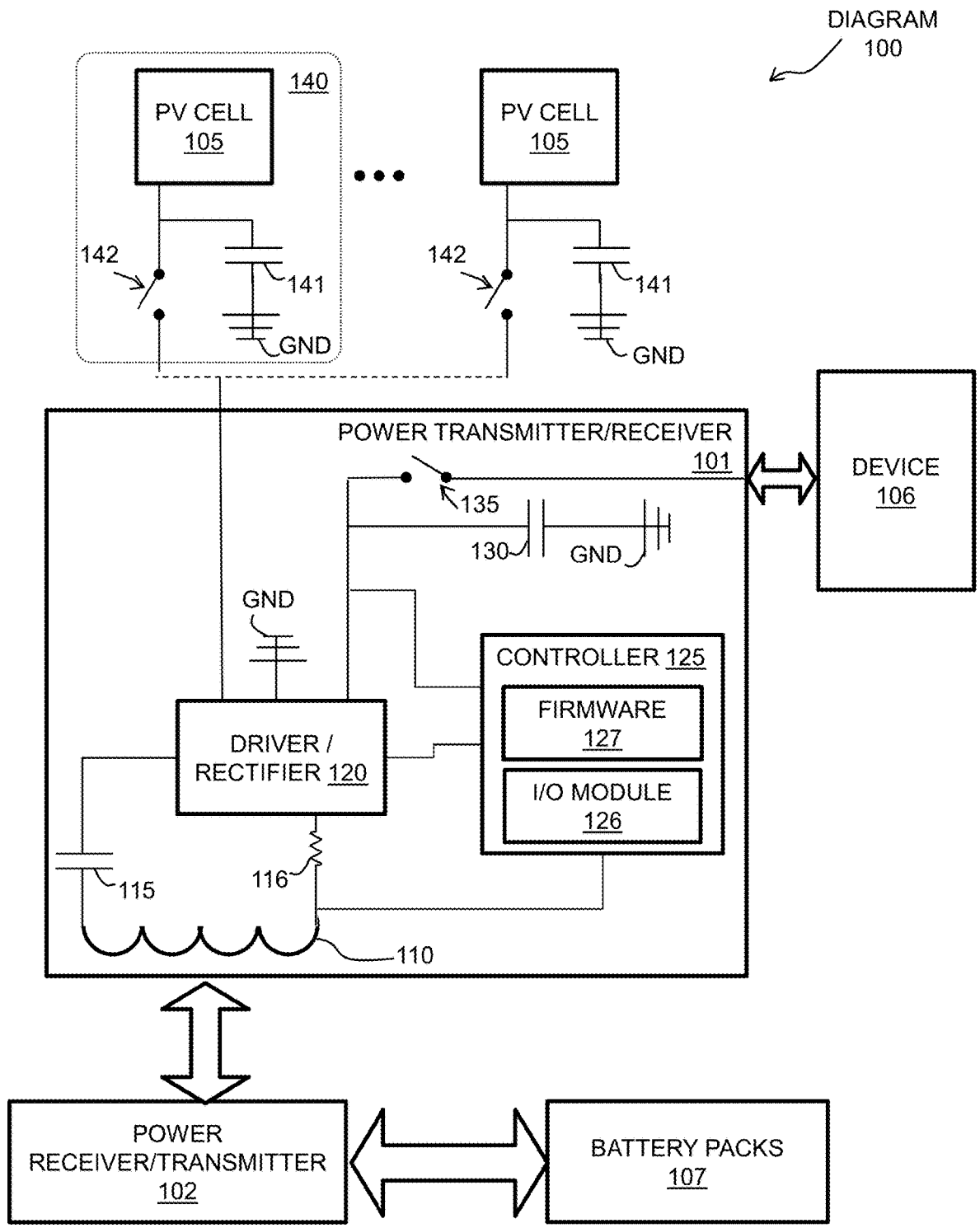
FIG. 1 depicts a diagram of a system in accordance with one or more embodiments.

FIG. 1 shows a diagram 100 of a system (e.g., a wireless PV power system) in accordance with one or more embodiments. The system comprises wireless power devices 101 and 102 (e.g., a wireless power unit and/or a transmitter-receiver device). Both of these devices 101 and 102 can act as a transmitter and/or a receiver based on a particular operation of the wireless PV power system. For ease of explanation, and without particularly limiting the dual functions of the wireless power devices 101 and 102, these devices 101 and 102 are referred herein as Tx 101 and Rx 102, respectively.

According to one or more embodiments, the Tx 101 can be any device that can generate electromagnetic energy from one or more PV cells 105 (e.g., AC power source) to a space around the Tx 101 that is used to provide power to the Rx 102 and/or one or more devices 106. The Rx 102 is any device that can receive, use, and/or store the electromagnetic energy when present in the space around the Tx 101. Note that the Rx 102 can have a similar or the same component structure as the Tx 101, and vice versa. Further, according to one or more embodiments, the Rx 102 can operate as a Tx and provide electromagnetic energy from one or more battery packs 107 to the Tx 101 operating as a Rx and, in turn, the one or more devices 106.

As shown in FIG. 1, the Tx 101 includes circuitry for generating and transmitting the electromagnetic energy (i.e., transmitting power). The circuitry of the Tx 101 may include a transmitter coil 110; a resonant capacitor 115; a shunt resistor 116 for AC current measurement; a driver/rectifier 120 (e.g., half bridge, full bridge, diode bridge rectifier, etc.); a controller 125, which further includes an input/output (I/O) module 126 and firmware 127; a rectifier capacitor 130.

According to one or more embodiment, the Tx 101 includes an inductor implemented as coil 110 that is driven by a field-effect transistor (FET) (e.g., the driver/rectifier 120) controlled by the controller 125. The coil 110 of the Tx 101 (and a coil of the Rx 102) can include standard electrical wiring copper wires folded and/or Litz wires.

For example, the coil 110 and the resonant capacitor 115 provide an LC circuit for generating an inductive current in accordance with operations of the driver/rectifier 120 and the controller 125 to support power transmissions. Further, according to one or more embodiments, the driver/rectifier 120 can be based on commercially available half-wave rectification; full-wave rectification; FET based full-wave rectification; and any combination thereof, or the like. For example, the driver/rectifier 120 can be any rectifier using one or more components, such as 4 diodes (e.g., asynchronous rectifier), 2 didoes and 2 FETs (half synchronous), 4FET (synchronous), or 2 capacitors and 2 switches, that are controlled by either a dedicated logic circuit or the controller 125. For instance, the driver/rectifier 120 can be a four diode bridge or use a single diode to produce half wave rectifier. The driver/rectifier 120 is followed by the rectifier capacitor 130.

Another side of the resonant capacitor 115 can be connected to a ground GND (i.e., for the single and dual FET topology) and to the second half of the full bridge (i.e., for the 4 FET topology). The coil 110 in the Tx 101 can be used to inductively couple to the coil of the Rx 102 and is connected to the resonant capacitor 115 (e.g., a serial resonance capacitor).

According to one or more embodiments, the controller 125 can include a sensing circuit, circuitry, and/or software, for sensing voltage and/or current of the Tx 101. The controller 125 can control and/or communicate any part of the Tx 101 to provide modulation injections as needed for power transfer. The controller 125 can include software therein (e.g., the firmware 127) that logically provides one or more of a FIR equalizer, an analyzer of in-band communication data, a selector for selecting a ping, a coupler for dynamically determining a coupling factor, a regulator for dynamically determining an operating frequency, etc. In this regard, the controller 125 can utilize a system memory and a processor, as described herein, to store and execute the firmware 127. According to one or more embodiments, the controller 125 can be utilized to perform computations required by the Tx 101 or any of the circuitry therein.

According to one or more embodiments, the controller 125 can utilize the I/O module 126 as an interface to transmit and/or receive information and instructions between the controller 125 and elements of the Tx 101 (e.g., such as the driver/rectifier 120 and/or any wiring junction or shunt resistor 116). For instance, the controller 125 can include a sensing circuit, circuitry, unit, and/or software for sensing voltage and/or current of the Tx 101 (e.g., sensing voltage and/or current from the one or more PV cells 105 or shunt resistor 116). According to one or more embodiments, the controller 125 can sense, through the I/O module 126 one or more currents or voltages, such as a AC input voltage (Vin) and a AC resonance circuit voltage (Vac). According to one or more embodiments, the controller 125 can activate, through the I/O module 126, one or more switches to change the resonance frequency (as the Rx 102 and/or the Tx 101 can include multiple switches for multiple frequencies). According to one or more embodiments, the controller 125 can may utilize the firmware 127 as a mechanism to operate and control operations of the Tx 101. In this regard, the controller 125 can be a computerized component or a plurality of computerized components adapted to perform methods such as described herein (e.g., MPPT operations/algorithms, CCCV charging operations/algorithms, burst mode operations, as well as others modes of operation). According to one or more embodiment, the Tx 101 provides a combinational implementation of MPPT of the one or more PV cells 105 and a power control of the one or more devices 106 (e.g., a power consuming device or a load). Further, the controller 125 can determine in which transmitter and/or receiver modes to operate the Tx 101. MMPT operations include when an electronic DC to DC converter optimizes a match between a solar array (i.e., the PV cells 105) and the battery pack 107. The CCCV charging operations/algorithms include implementing a dynamic model battery charge based on a constant current stage and a constant voltage stage.

The Rx 102 includes circuitry for receiving, providing, and/or storing the electromagnetic energy, which can be further provided to a load therein. The load can be a single instance or any combination of electronic components, such as the one or more one or more battery packs 107, as well as other circuit components (e.g., resistors, capacitors, etc.). By way of example, the Rx 102 can be configured to provide CCCV operations to control a charging of the battery pack 107.

According to one or more embodiments, the Rx 102 includes at least the coil (as describe herein), which is configured to interact with a magnetic field of the Tx 101 to wirelessly obtain induced power that charges the one or more battery packs 107. The Rx 102, itself, can further include one or more capacitors for storing the induced power. The Rx 102 can include a controller as described herein and/or feedback circuitry to communicate with the Tx 101.

According to one or more embodiments, for a standalone PV cell (i.e., when there is no power consuming device coupled to the one or more PV cells 105), the Tx 101 can operate as a transmitter only.

According to one or more embodiments, the wireless PV power system can include one or more PV cell units 140, each of which can have a similar structure. For instance, the PV cell unit 140 can include at least a capacitor 141, a switch 142 (e.g., a switching FET), and a ground GND. The capacitor 141 can smooth out power generated by the PV cell 105 (e.g., take power from different time periods for the corresponding PV cell 140) to control/optimize output of the PV cell unit 140. An output of each PV Cell units 140 can be connected to the one or more devices 106 and/or the coil 110. For example, multiple PV cell units 140 can be connected in parallel. In turn, the wireless PV power system utilizes an optimize MPPT operation for the combined PV cell units 140 (i.e., the controller 125 finds a best single operation voltage that would provide a highest combined power from the PV cell units 140 when the PV cells 105 therein all operate at same voltage).

As another example, each PV cell 105 in the multiple PV cell units 140 can be controlled separately by activating the corresponding switch 142 and connecting the corresponding capacitor 141 and/or the corresponding PV cell 105. A capacitance of the capacitor 141 is configured to be significantly higher than a capacitance of a stabilization capacitor (e.g., stabilization capacitor 230 of FIG. 2 described herein). The controller 125 can also provide individual MPPT control for each of the PV cells 105 and operate each of the PV cells 105 at an optimal voltage for maximal power.

As indicated herein, the controller 125 can determine in which mode to operate the Tx 101, either as transmitter and/or as receiver (as both options are possible in terms of hardware of the Tx 101 and the firmware 127. According to one or more embodiments, the one or more PV cells 105 can be coupled directly to the one or more devices 106 (e.g., a power consuming device or a load) via a switch 135. In this regard, when the power consuming device is coupled to the one or more PV cells 105, then the Tx 101 can operate as both a transmitter and a receiver.

Figure 2:
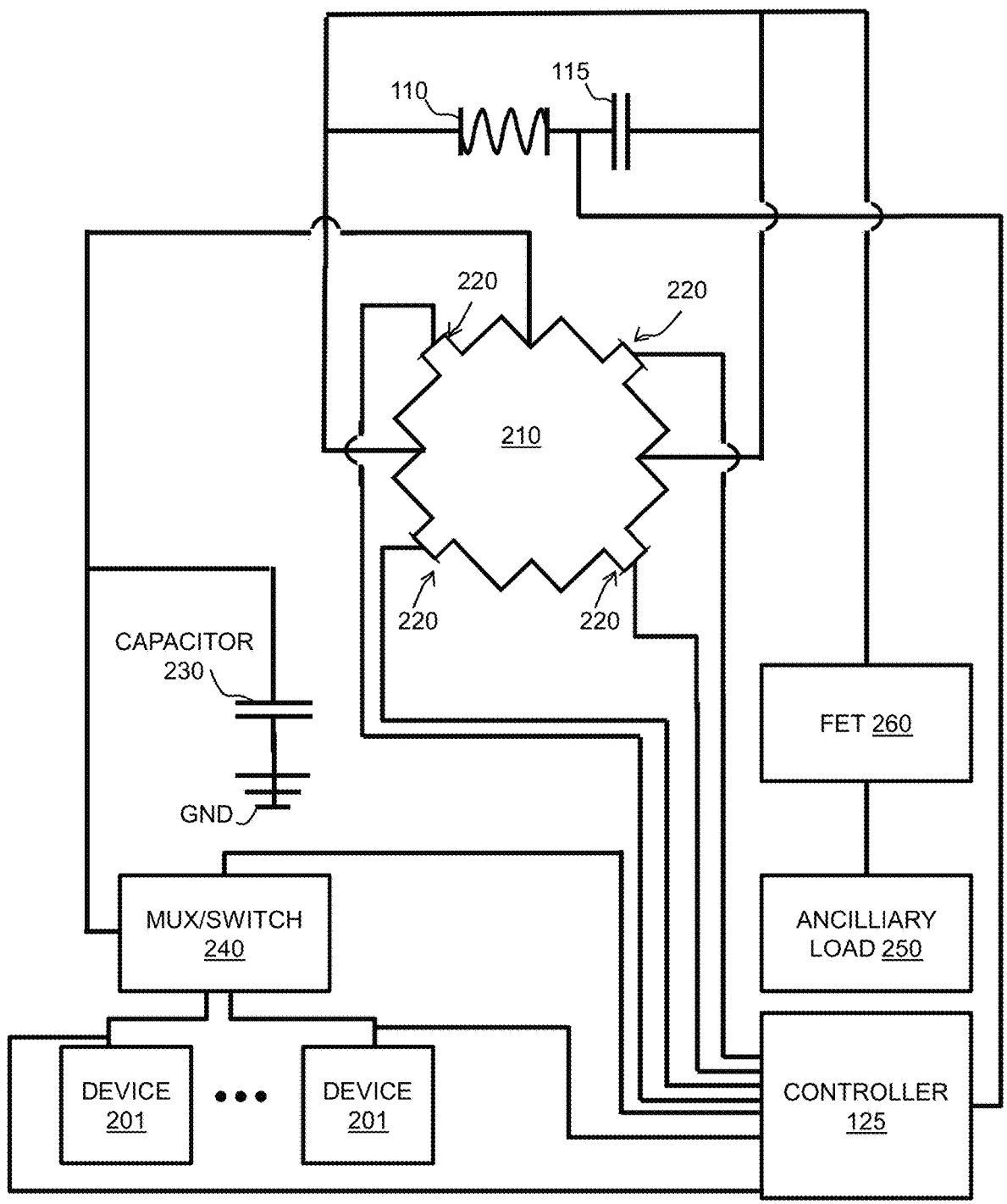
FIG. 2 depicts a diagram in accordance with one or more embodiments.

Turning now to FIG. 2, a diagram 200 of one or more devices 201 associated with a wireless power unit is depicted in accordance with one or more embodiments. Examples of the devices 201 include, but are not limited to battery cells and power consuming device. Note that the devices 201 can be connected to a wireless power unit that can operate as a transmitter and/or a receiver. For brevity and ease of explanation, items of FIG. 1 that are the same or similar are reused in FIG. 2.

The wireless power unit includes a coil 110 connected to a resonant capacitor 115. The coil 110 and capacitor 115 are connected to a bridge 210 that can operate as a rectification bridge (i.e., when the wireless power unit operates as a receiver) or as full bridge driver (i.e., when the wireless power unit operates as a transmitter). According to one or more embodiments, the bridge 210 can be composed of four FET devices 220 that are switched to achieve a desired operation mode (e.g., the transmitter and/or receiver modes).

When the wireless power unit is in the receiver mode, an output of the rectification bridge (e.g., the bridge 210) is connected to a stabilization capacitor 230 and to output switches (e.g., a multiplexer (MUX)/switch 240). The multiplexer (MUX)/switch 240 further connects the devices 201 to the bridge 210 and the stabilization capacitor 230. According to one or more embodiments, when the wireless power unit is in the receiver mode, the wireless power unit can include a switch connecting a detuning capacitor to the coil 110 and the resonance capacitor 115. The switch can be closed to detune the circuit, reduce the output voltage of a rectifier (e.g., of the bridge 210), and control output to the devices 201 (e.g., a battery). In some cases, a output switch to the battery can be omitted (i.e., for two way transfer).

When the wireless power unit is in the receiver mode, a driver (e.g., of the bridge 210) uses the stabilization capacitor 230 to stabilize a DC voltage supplying power to the full bridge and eventually transmitted via the coil 110.

Ancillary load 250 can be connected or disconnected from the resonance circuit (e.g., the capacitor 115 and the coil 110) or from a rectified output of the bridge 210. The ancillary load 250 can includes one or more resistors, capacitors, or combination thereof. A connection of the ancillary load 250 can be controlled via a FET 260. The ancillary load 250 can be used for various implementations such as, in-band modulation, minimal load, tuning or detuning of the resonant tank, etc.

A controller 125 can be connected to the bridge 210 to control operations therein. The controller 125 can also be connected to individual battery cells (e.g., the devices 201) and can measure voltage and charging/discharge currents thereof. According to one or more embodiments, the controller 125 can be connected to a battery pack via digital interface, such as system management bus, and can probe battery voltage and currents via the digital interface. The controller 125 can also monitor voltage of the resonance circuit (e.g., capacitor voltage of the capacitor 115 and inductor voltage of the coil 110) as well as AC currents on the resonance circuit (e.g., by measuring of voltage of resistive element, via capacitor voltage derivation, current transformer, etc.). The controller 125 can also control the ancillary load 250 and the FET 260 to modulate load and send data from a receiver to a transmitter.

Figure 3:
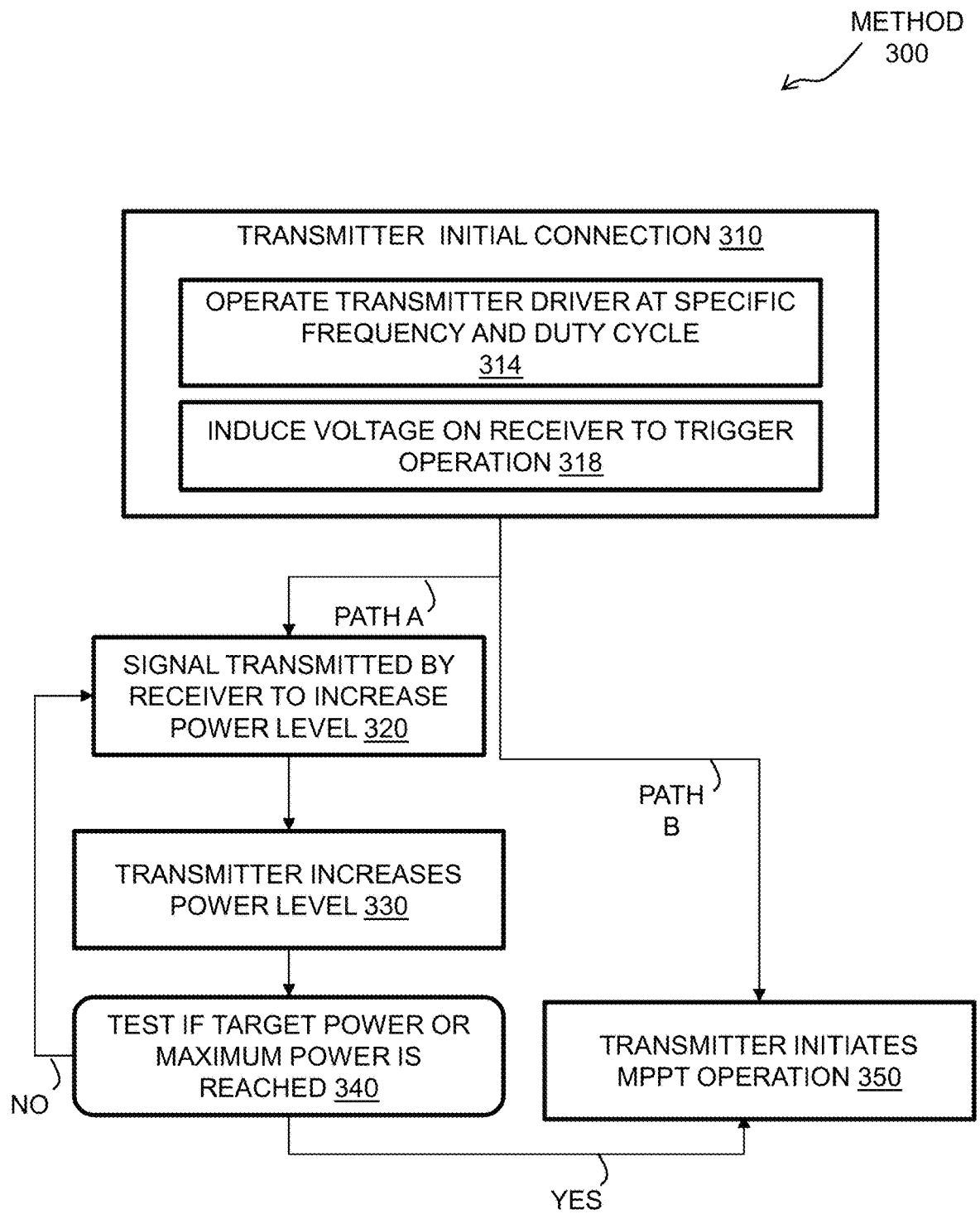
FIG. 3 depicts a method in accordance with one or more embodiments.

FIG. 3 depicts a method 300 in accordance with one or more embodiments. The method 300 can be embodied by the firmware 127 and executed by the controller 125 116. Generally, the method 300 is an implementation of initially operating to achieve constant current charge to the battery pack 107. For brevity and ease of explanation, items of FIGS. 1-2 that are the same or similar are reused in FIG. 3.

The method 300 begins when the Tx 101 starts an initial connection to the Rx 102. As shown in at block 310, the Tx 101 starts a connection with the Rx 102. The Rx 102 may operate to implement a CCCV charging algorithm to a battery (i.e., the battery pack 107) connected to the Rx 102 or may implement fixed voltage output algorithm. A control over a power level of the Rx 102 can be implemented through a control of transferred power from the Tx 101 by the Rx 102 sending commands to the Tx 101. In this regard, at sub-blocks 314 and 318, the Tx 101 can operate drivers therein at specific frequency (e.g., a target point as defined or set by the firmware 127) and at a duty cycle provide enough induced voltage on the Rx 102 for the Rx 102 to start operation. The target point defined or set by the firmware 127 can include, but is not limited to, a set power level or a maximum power. The induced voltage can be selected at along a range of 5-10 volts. The induced voltage can be below a voltage level (e.g., 20-25 volts) required to charge the battery pack 107, so that the Rx 102 refrains from a current flow to the battery pack 107 (at this stage).

The method 300 can continue through Path A or Path B, for example, according to operations of the controller 125, signals/commands sent to the Tx 101 by the Rx 102, and/or based on reaching the Tx 101 reaching an operation point. With respect to Path A and block 320, the Rx 102 signals the Tx 101 to increase a power level, as required until reaching a desired voltage for reaching a predefined charge current level. Note that, when in the constant current portion of the CCCV charge cycle, the Rx 102 checks to determine if there is enough voltage to charge the battery pack 107. Note also that, when in the constant voltage portion of the CCCV charge cycle, the Rx 102 checks to determine the fixed voltage level. According to one or more embodiments, if a high current level is set by the firmware 127, it can be determined that the Tx 101 based on a power capability of the one or more PV cell units 140 may not be able to reach the high current level (e.g., if the PV cells 105 cannot provide enough watts). In this case, the Rx 102 or the Tx 101 can sense that no further increase is possible and switch to the MPPT operation.

At block 330, the Tx 101 increases an amplitude of magnetic field emitted by the coil 110 to increase voltage and power level of the Rx 102. According to one or more embodiments, increasing the amplitude of the magnetic field by the Tx 101 can be implemented by changing an operating frequency, the duty cycle, and/or (c) an amplitude of a switched DC voltage.

At decision block 340, the Tx 101 tests whether a set power level or the maximum power is reached. That is, once the target point is reached, the Tx 101 transfers to MPPT operation (as shown by the YES arrow). In the MPPT mode of operation, the operation point is modified based on internal feedback, as well as feedback from the Rx 102. If the target point is not reach, the method return to block 320 (as shown by the NO arrow).

With respect to Path B and block 350, the Tx 101 initiates the MPPT operation (e.g., the Tx 101 goes directly to MPPT operation as described herein).

Figure 4:
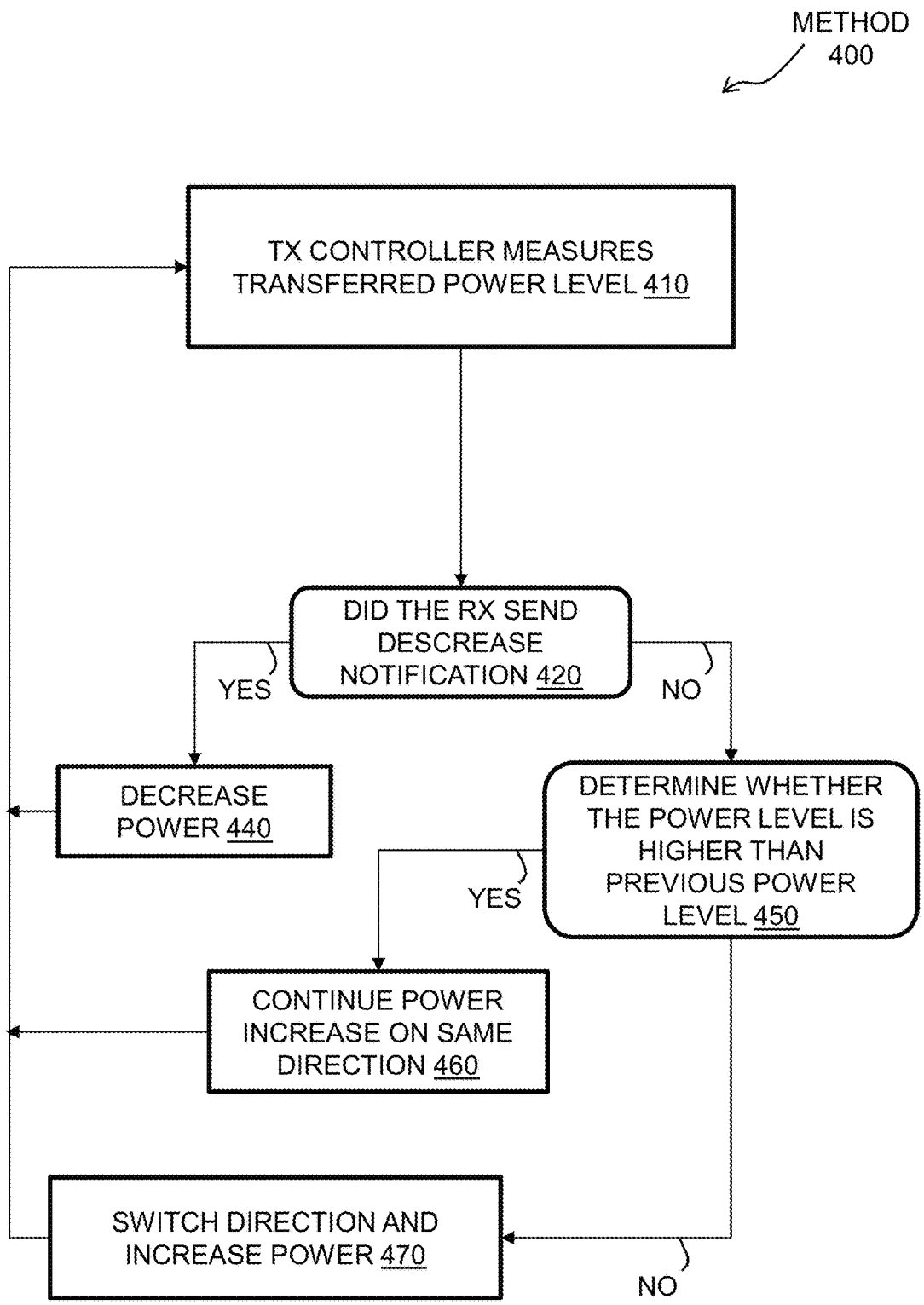
FIG. 4 depicts a method in accordance with one or more embodiments.

FIG. 4 depicts a method 400 in accordance with one or more embodiments. The method 400 can be embodied by the firmware 127 and executed by the controller 125 116. Generally, the method 400 is an implementation of the MPPT operation. For brevity and ease of explanation, items of FIGS. 1-3 that are the same or similar are reused in FIG. 4.

The method 400 beings at block 410, where the controller 125 of the Tx 101 measures transferred power level. In an example, the controller 125 can measure a DC voltage and a current from the PV cell units 140 to the bridge 210. During this time, the Rx 102 can send the Tx 101 notifications. For instance, the Rx 102 can send a decrease notification. In this regard, the Tx 101 needs to satisfy whether the receiver needs less power. According to one or more embodiments, the notifications can indicate whether a charging current level exceeds a maximal allowed during constant current operation or whether a voltage is higher than permitted for constant voltage operation. Further, the notifications can be in a form of an error packet that request a negative change to operation point.

At decision block 420, the Tx 101 determines if the Rx 102 sent the Tx 101 a decrease notification. If yes, the method 400 proceeds (as shown by the YES arrow) to block 440. At block 440, the Tx 101 decreases the power. Then, the method 400 returns to block 410. If no, the method 400 proceeds (as shown by the NO arrow) to block 450.

According to one or more embodiments, once such indication is received from the Rx 102, the Tx 101 stops attempting to increase power level and slightly reduces power level (i.e., by increasing or decreasing duty cycle depending on direction of change). The Tx 101 can resume attempts to optimize power after a defined delay or on indication from the Rx 102 (or combination of). Further, the indication can be reception of an error packet with a request for zero or positive change to operation point.

At decision block 450, the Tx 101 determines whether the power level is higher than the measured power level on previous measurement (such as a previous pass of block 410). If yes, the method 400 proceeds (as shown by the YES arrow) to block 460. If no, the method 400 proceeds (as shown by the NO arrow) to block 470.

At block 460, the Tx 101 continues a power increase on a same direction. That is, the Tx 101 gradually increases duty cycle or reduces frequency, as long as transferred power increases. Then, the method 400 returns to block 410 so that the power level can be measured again (e.g., checks to make sure operations are successful).

At block 470, the Tx 101 switches direction and continues a power increase. Then, the method 400 returns to block 410 so that the power level can be measured again (e.g., checks to make sure operations are successful). For example, the Tx 101 reverses a direction and starts to decrease the duty cycle or increase the frequency (i.e., once the transferred power starts going down). Note that the method 400 can loop, such that the Tx 101 can continue doing so as long as power increases, and will switch back if the power decreases.

According to one or more embodiments, measurements and decisions by the controller 125 are performed with delay from a duty cycle/frequency change to accommodate a settling time of the wireless PV power system (e.g., a duration of settling time can be determined by value of capacitance on the Rx 102 and the Tx 101).

According to one or more embodiments, the Tx 101 can halt modifications to duty cycle or frequency for a defined period of time, if maximal point is reached.

According to one or more embodiments, additional notifications/messaging/communications can be used to indicate a change in charge mode, a start/end of charging, a battery charge state, a temperature, etc. The controller 125 can any notifications/messaging/communications to modify an operation point.

Figure 5:
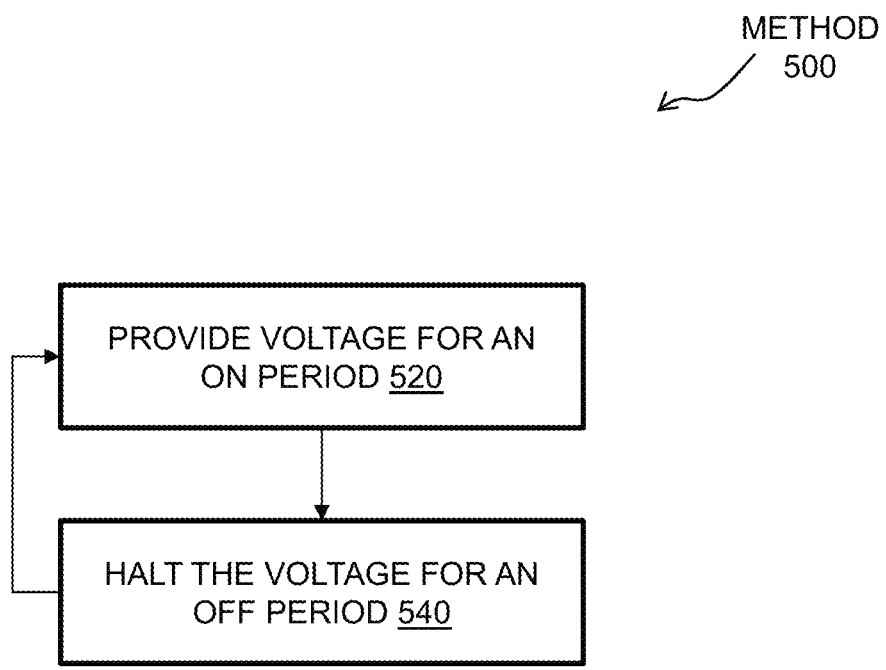
FIG. 5 depicts a method in accordance with one or more embodiments.

FIG. 5 depicts a method 500 in accordance with one or more embodiments. Generally, the method 500 describes burst mode operation of the bridge 210 by the controller 125 of the Tx 101. In this regard, at block 520, the bridge 210 operates and provides alternate voltage for a specific time period (i.e., an On period). At block 540, the bridge 210 halts and does not provide voltage drive for a second time period (i.e., an Off period). The burst duration (e.g., a total of the On and Off periods) can be determined by the controller 125 to not significantly discharge the Tx 101 capacitance during the On period of a cycle. According to one or more embodiments, the total durst duration can include a 1.5 milliseconds cycle, with the On period being 300 microseconds.

One or more technical effects, advantages, and benefits of the wireless PV power system operating in a burst mode include, but are not limited to system efficiencies. In this regard, the PV cells 105 may be limited to a certain power level (e.g., in an exemplary implementation, limited to 5 watts power level), while a transfer efficiency is higher for higher power levels (e.g., 25 watts). By leveraging the burst mode operation, the Tx 101 of the wireless PV power system operates at transfer power of 25 watts when active, while providing an average transfer power of 5 watts that can be supplied by the PV cells 105. Further, capacitors of the Tx 101 can fill up from the PV cell 105 (i.e., stall energy when not transmitting), and then empty to the Rx 102 at a much higher efficiency. The burst mode operation requires the controller 125 to provide a strict timing operation to satisfy requirements of the wireless PV power system.

Further, according to one or more embodiments, a capacitance of the Tx 101 can be set to accommodate the burst duration and to maintain a minimal voltage reduction during that period. In terms of the transmitted power stability, the Tx 101 can compensate for the voltage reduction during the burst duration by increasing duty cycle as the On period progresses.

By way of example, the burst duration can be set to 1.5 milliseconds, the controller 125 can assume 25 watts of power is be transmitted during the On period, the PV cell 105 is supplying a 5 watt, and the On period can be 300 microseconds. In this case, a PV optimal voltage can be 18 volts, with an overall ripple of a 1 volt max being achieved, while capacitance can be required according to Equation 1.

$$C * dV = Q = I * T_{on} = \frac{dP}{V} * T_{on} \rightarrow C =$$

$$dP * \frac{T_{on}}{(v * dV)} = (25 - 5) + 3 * \frac{10^{-4}}{(18 * 1)} = 10^3 = 333 \ \mu F$$

Equation 1

According to one or more embodiments, MPPT optimization is available during the burst mode operation. When multiple PV cells 105 are used, the controller 125 can initiate multiple power transfer bursts. In this regard, on each burst, one of the PV cells 105 is connected to bridge to supply power for transmission via a relevant storage capacitor. Further, an optimization of voltage can be performed for each PV cell 105 individually. IN this case, the method 500 can still be applied, while tracking of any transferred power is performed for each of the bursts and respective PV cells 105, separately.

According to one or more embodiments, the burst mode operations can cause some jumps on a voltage of the bridge 210, when switching operations between PV cells 105. Yet, given a capacitance connected directly to the bridge 210 is relatively small compared to an individual capacitance of the PV cell 105 and given an overall charge transferred in a single burst, any losses due to these switches are going to be relatively low.

According to one or more embodiments, the burst mode operations can include an alternative communication scheme between the Tx 101 and the Rx 102 (in contrast to a continuous mode). For instance, communications from the Rx 102 to the Tx 101 may need to be adjusted during the burst mode operations. In a communication scheme, the Rx 102 to the Tx 101 communication can use messages that include 10s of bits and that last 10s of milliseconds. Note that wireless power consumption (WPC) message requires 44 bits and 22 milliseconds of transmission time, which are relatively long bit times. In improving and updating the communication scheme, the wireless PV power system can stop the bursts to communicate (e.g., no communication during the bursts). In this regard, because bursts are shorter than non-burst time periods and because the burst mode operation can be activated after an initial negotiation between wireless PV power system operating (e.g., the initial negotiation can set an initial operational point), an amount of data exchanged during the burst mode operation can be minimal and composed of very few data bits. In turn, the controller 125 can use short pulse patterns that can be synchronized to power carrier cycles. Note that set of patterns can being be unique and orthogonal to each other (i.e., a match filter for one of the patterns yields a 0 for the others). Further, the short pulse patterns length can be shorter than the On period of the cycle.

According to one or more embodiments, the Tx 101 combines and implements standard power control for the load and MPPT operations/algorithms with the one or more PV cell units 140. Further, the Rx 102 simultaneously operates CCCV operations/algorithms or other operations/algorithms to control battery charging and enables MPPT operations/algorithms of the one or more PV cell units 140. Note that the MPPT operations/algorithms can be characterized by switching a direction of a control by the controller 125 of the Tx 101 to determine a maximal power point.

According to one or more embodiments, the Tx 101 operates at bursts to improve power efficiency of transfer. The Tx 101 can further switch between burst operations and continuous operations based on a power state of the one or more PV cell units 140 or a state of the Rx 102. The Rx 102 can initiate burst mode operations by sending a request (e.g., a specific request) to the Tx 101. The specific request can define a burst length or a number of bursts. The Tx 101 and/or the Rx 102 can perform burst mode operations while maintaining MPPT operations/algorithms.

According to one or more embodiments, a pattern of 8 bits can be sent by the controller 125. Examples of the pattern of 8 bits can include, but is not limited to, 0xAA, 0x33, 0x0F, and 0x00, where each codes a different message. For instance, each of these patterns can code to a voltage/current threshold has been reached, a charge is complete, a charge is stopped, and a charge ongoing. Each bit can be sent over a defined number of carrier cycles (e.g., four cycles). For instance, a transmission can last over 32 carrier cycles, which may take a total of 256 microseconds if a carrier frequency of 125 kilohertz is used.

According to one or more embodiments, a '1' bit can be sent by activating the ancillary load 250, while a '0' bit can be sent by disabling the ancillary load 250. The controller 125 can implement similar coding schemes to derive similar functionality for other elements of the wireless PV power system.

According to one or more embodiments, a match filter for each of one or more filters may be derived based on training sequence at start of burst mode operations. The Rx 102 can send each of the patterns at a known order, allowing the Tx 101 to 'learn' an expected reception signal for each of the transmitted signals. In this way, the wireless PV power system can employ different modes of operation and dynamically switch therebetween.

According to one or more embodiments, no communication is performed during the bursts. The Tx 101 or the Rx 102 initiates burst mode operations indicating the interval (i.e., burst length) or number of bursts to be initiated. At the end of a burst period, the Tx 101 resume/continues operation. The Rx 102 can then communicate with the Tx 101 using a non-burst mode communication protocol to signal if a change to an operation point is required or if burst mode operations can be resumed for another interval.

According to one or more embodiments, the Rx 102 can initiate burst mode operations by sending a dedicated burst request packet (e.g., a specific requests). The packet includes the number of bursts to be initiated, were the On and Off periods of each bursts are pre-configured at the Tx 101 and the Rx 102. The Tx 101 can initiate a number of defined bursts, as in the received packet. When a burst interval is completed, the Tx 101 can resume/continues operation. The Rx 102 monitors power, current, and/or voltage during the burst period. The Rx 102 can initiate an error packet if a value is outside a desired range, if the value is within a required window, and resend a burst request packet to initiate another burst interval.

According to one or more embodiments, the wireless PV power system can select to enter or exit burst mode operations according to a state of the one or more PV power sources or the PV cells including, but not limited to, a maximal power currently achievable by the one or more PV power sources or PV cells or by a load level or charging phase of the Rx 102 and an ability of the Tx 101 to satisfy this load level. In an exemplary implementation of the wireless PV power system, the Rx 102 initiates the burst mode operations when the Rx 102 attempts to request an increase of power level but does not get an actual increase of power for a defined period of time. In an exemplary implementation of the wireless PV power system, the Rx 102 requests the burst mode operations when entering constant current (CC) phase of battery charging and exists the burst mode operations when moving to constant voltage (CV) phase of charging.

According to one or more embodiments, the wireless PV power system provides a 'standby' mode of operation enabling a power consuming device (e.g., the one or more devices 106) to be powered at very low power consumption from the one or more battery packs 107. Further, the wireless PV power system can provide/maintain an efficient operation vs. a 'full power' mode of operation to provide higher power levels to the consumer. In efficient operation, the controller 125 on the power consuming device side of the wireless PV power system signals the Tx 101 on the battery pack 107 that a lower voltage level is to be delivered (e.g., instead of a voltage used for 'full power' operation). The signaling can be based on continued feedback of power increase/decrease commands that set the Tx 101 to an operation point that provides a low voltage level on the Rx 102, or by signaling for a standby mode as part of initial signaling. The standby mode causes the Tx 101 to set an operational point, accordingly. to meet the lower voltage requirement. The Tx 101 can also initiate burst mode operations to minimize power consumption.

According to one or more embodiments, the wireless PV power system can revert between different modes of operation (i.e., battery charging, consumer full power driving, consumer standby driving, and others described herein) based on a consumer and PV cells state. If a current state is that a battery operates as a Tx and the controller 125 determines to move to an off mode or a battery charging mode (e.g., were the controller 125 becomes the Tx 101), the controller 125 sends a terminate charge message to the battery pack 107. Once a power carrier is removed, the controller 125 can operate as a Tx or shut down (according to desired mode). If a current state include that the controller 125 operates as a Tx or is not active, and the controller 125 requires to move to a standby mode or a full power, the controller 125 can first terminate a Tx mode (if active) by shutting down power carrier, and then close the bridge 210 to provide a short of the resonance circuit. This short indicates to the controller on other side that power transfer is required. If the controller 125 moves to Off state, the controller 125 will terminate Tx operation if active and leave the bridge 210 open to have the resonance circuit in open circuit state.

According to one or more embodiments, the wireless PV power system can provide a role reversal. In this case a battery side controller operates in Rx mode, while waiting for 'digital ping' (i.e. a carrier activation from the other side). If the battery side controller is not in a power transfer phase, battery side controller can perform a periodic analog ping by sending a pulse or train of pulses on a bridge therein and measure a bridge voltage decay. The battery side controller can distinguish if there is a shorted circuit on the other side, and if so, the battery side controller can revert to operate as a Tx and initiate power transfer. The battery side controller can cease Tx operation when receiving a terminate charge message from the other side.

According to one or more embodiments, the wireless PV power system can enable the battery side controller to start operations in listen mode. The listen mode includes when the battery side controller waits for a power carrier signal on a rectifier therein. If the battery side controller does find the power carrier signal, the battery side controller initiates analog pings to detect a receiver. Further, the battery side controller can initiate transmitter operations if a receiver is detected. If no receiver is detected or no engagement achieved, the battery side controller can revert back to a listening mode. If during the listening mode, the battery side controller detects a carrier, the battery side controller can revert to a receive operation. Similar logic can also be applied by the Tx 101, with compensation for different timing constraints.

Figure 6:
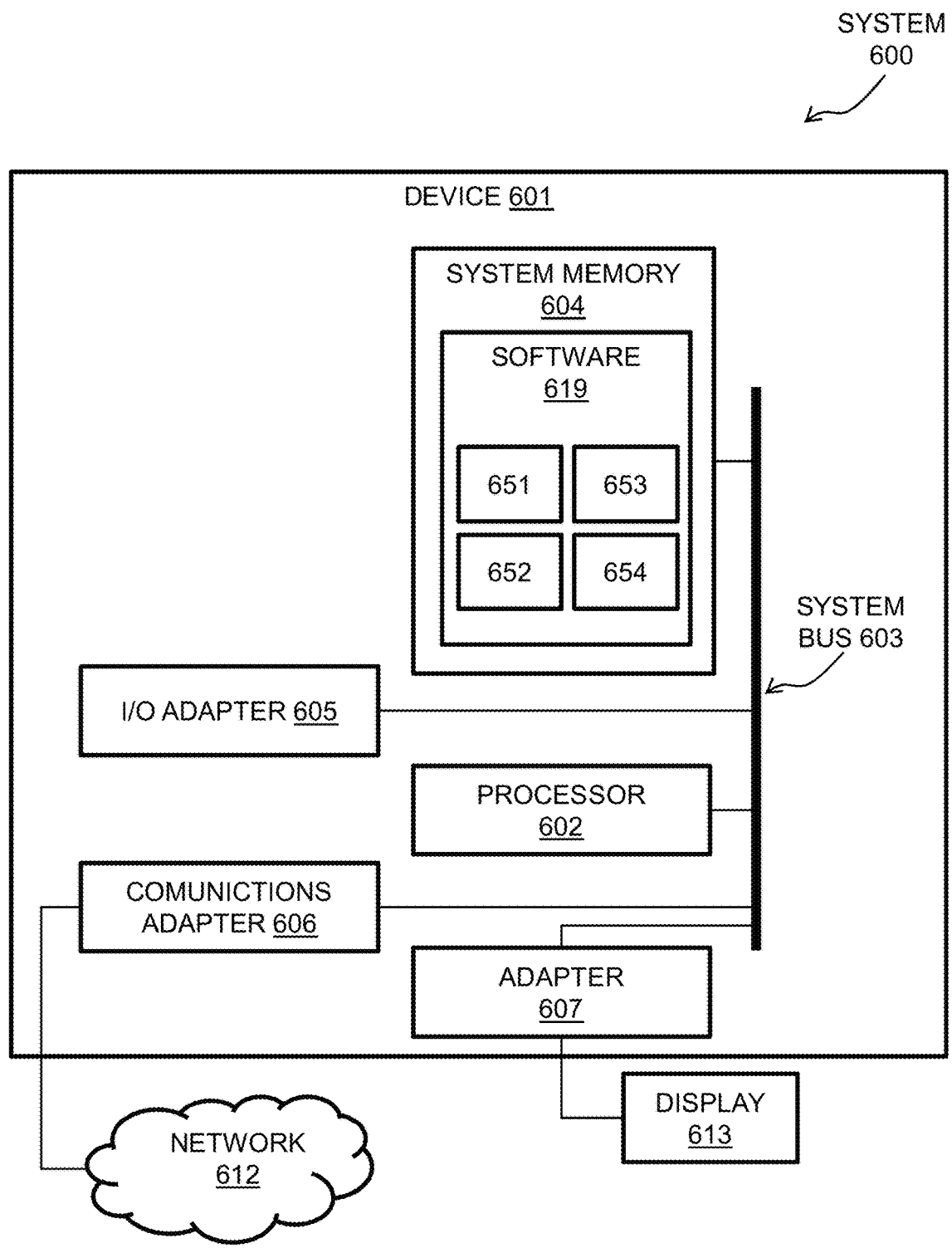
FIG. 6 depicts a system in accordance with one or more embodiments.

FIG. 6 depicts a system 600 in accordance with one or more embodiments. The system 600 has a device 601 (e.g., the Rx 102 and/or the Tx 101 of the system 100 of FIG. 1) with one or more central processing units (CPU(s)), which are collectively or generically referred to as processor(s) 602 (e.g., the controller 125 of FIG. 1). The processors 602, also referred to as processing circuits, are coupled via a system bus 603 to system memory 604 and various other components. The system memory 604 can include a read only memory (ROM), a random access memory (RAM), internal or external Flash memory, embedded static-RAM (SRAM), and/or any other volatile or non-volatile memory. For example, the ROM is coupled to the system bus and may include a basic input/output system (BIOS), which controls certain basic functions of the device 601, and the RAM is read-write memory coupled to the system bus 603 for use by the processors 602.

FIG. 6 further depicts an I/O adapter 605, a communications adapter 606, and an adapter 607 coupled to the system bus 603. The I/O adapter 605 may be a small computer system interface (SCSI) adapter that communicates with a drive and/or any other similar component. The communications adapter 606 interconnects the system bus 603 with a network 612, which may be an outside network (power or otherwise), enabling the device 601 to communicate data and/or transfer power with other such devices (e.g., such as the Tx 101 connecting to the Rx 102). A display 613 (e.g., screen, a display monitor) is connected to the system bus 603 by the adapter 607, which may include a graphics controller to improve the performance of graphics intensive applications and a video controller. Additional input/output devices cab connected to the system bus 603 via the adapter 607, such as a mouse, a touch screen, a keypad, a camera, a speaker, etc.

In one embodiment, the adapters 605, 606, and 607 may be connected to one or more I/O buses that are connected to the system bus 603 via an intermediate bus bridge. Suitable I/O buses for connecting peripheral devices such as hard disk controllers, network adapters, and graphics adapters typically include common protocols, such as the Peripheral Component Interconnect (PCI).

The system memory 604 is an example of a computer readable storage medium, where software 619 can be stored as instructions for execution by the processor 602 to cause the device 601 to operate, such as is described herein with reference to FIGS. 1-5. In connection with FIG. 1, the software 619 can be representative of firmware 127 for the Tx 101, such that the memory 604 and the processor 602 (e.g., of the controller 125) logically provide a FIR equalizer 651, an analyzer 652 of in-band communication data, a selector for selecting a ping, a coupler 653 for dynamically determining a coupling factor, a regulator 654 for dynamically determining an operating frequency, etc.

According to one or more embodiments, a wireless photovoltaic power system is provided. The wireless photovoltaic power system includes one or more photovoltaic cell units that provide power. Each of the one or more photovoltaic cell units that include a photovoltaic cell. The wireless photovoltaic power system includes a first wireless power device that receives the power. The wireless power device includes a coil that provides a magnetic field to wirelessly transfer the power to a second wireless power device. The first wireless power device provides a combinational implementation of a maximum power point tracking of the one or more photovoltaic cell units and a power control of a load.

According to one or more embodiments or any of the wireless photovoltaic power system embodiments herein, the wireless photovoltaic power system can include the second wireless power device that engages the magnetic field to generate the second power. The second wireless power device can provide constant current constant voltage operations to control a battery charging.

According to one or more embodiments or any of the wireless photovoltaic power system embodiments herein, the first wireless power device or the second wireless power device can perform burst mode operations while the maximum power point tracking is maintained in the wireless photovoltaic power system.

According to one or more embodiments or any of the wireless photovoltaic power system embodiments herein, the maximum power point tracking of the one or more photovoltaic cell units can include switching a direction of a control by a controller of the first wireless power device to determine a maximal power point.

According to one or more embodiments or any of the wireless photovoltaic power system embodiments herein, the first wireless power device can operate at bursts to improve power efficiency of the transfer of the power.

According to one or more embodiments or any of the wireless photovoltaic power system embodiments herein, the first wireless power device can switch between burst operations and continuous operations based on a power state of the one or more photovoltaic cell units or a state of the second wireless power device.

According to one or more embodiments or any of the wireless photovoltaic power system embodiments herein, the second wireless power device can initiate burst mode operations by sending a specific request to the first wireless power device.

According to one or more embodiments or any of the wireless photovoltaic power system embodiments herein, the request can define a burst length or a number of bursts.

According to one or more embodiments or any of the wireless photovoltaic power system embodiments herein, each of the one or more photovoltaic cell units can include at least a capacitor that smooths out power generated by the corresponding photovoltaic cell.

According to one or more embodiments or any of the wireless photovoltaic power system embodiments herein, each of the one or more photovoltaic cell units can include a switch configured to connect the one or more photovoltaic cell units to the first wireless power device.

According to one or more embodiments or any of the wireless photovoltaic power system embodiments herein, the one or more photovoltaic cell units can connect to the first wireless power device in parallel.

According to one or more embodiments or any of the wireless photovoltaic power system embodiments herein, each of the one or more photovoltaic cell units can be separately connected to and controlled by a controller of the first wireless power device.

According to one or more embodiments or any of the wireless photovoltaic power system embodiments herein, the first wireless power device can be couple the one or more photovoltaic cell units directly to one or more power consuming devices via a switch.

According to one or more embodiments or any of the wireless photovoltaic power system embodiments herein, the first wireless power device can operate in a receiver mode.

According to one or more embodiments, a wireless photovoltaic power system is provided. The wireless photovoltaic power system includes a wireless power transmitter-receiver that includes a coil configured to provide a magnetic field to wirelessly induced power. The wireless photovoltaic power system includes one or more photovoltaic cell units that provide power to the wireless power transmitter-receiver. Each of the one or more photovoltaic cell units include a photovoltaic cell.

According to one or more embodiments of any of the wireless photovoltaic power system embodiments herein, each of the one or more photovoltaic cell units comprises at least a capacitor configured to smooth out power generated by the corresponding photovoltaic cell.

According to one or more embodiments of any of the wireless photovoltaic power system embodiments herein, each of the one or more photovoltaic cell units can include a switch configured to connect the one or more photovoltaic cell units to the wireless power transmitter-receiver.

According to one or more embodiments of any of the wireless photovoltaic power system embodiments herein, the one or more photovoltaic cell units can be connected to the wireless power transmitter-receiver in parallel.

According to one or more embodiments of any of the wireless photovoltaic power system embodiments herein, each of the one or more photovoltaic cell units can be separately connected to the wireless power transmitter-receiver and controlled by a controller of the wireless power transmitter-receiver.

According to one or more embodiments of any of the wireless photovoltaic power system embodiments herein, the wireless power transmitter-receiver can be configured to couple the one or more photovoltaic cell units directly to one or more power consuming devices via a switch.

According to one or more embodiments of any of the wireless photovoltaic power system embodiments herein, the wireless power transmitter-receiver can be configured to operate in a receiver mode.

According to one or more embodiments of any of the wireless photovoltaic power system embodiments herein, the wireless power transmitter-receiver can be configured to operate in a burst mode.

According to one or more embodiments of any of the wireless photovoltaic power system embodiments herein, the wireless power receiver can include a driver, a resonance capacitor, and a rectification capacitor.

As indicated herein, embodiments disclosed herein may include apparatuses, systems, methods, and/or computer program products at any possible technical detail level of integration. The computer program product may include a computer readable storage medium (or media) having computer readable program instructions thereon for causing a controller to carry out aspects of the present invention.

The computer readable storage medium can be a tangible device that can retain and store computer readable program instructions. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions described herein can be communicated and/or downloaded to respective controllers from an apparatus, device, computer, or external storage via a connection, for example, in-band communication. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The flowchart and block diagrams in the drawings illustrate the architecture, functionality, and operation of possible implementations of apparatuses, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the flowchart and block diagrams in the drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used herein, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A wireless photovoltaic power system comprising:
one or more photovoltaic cell units configured to provide power, each of the one or more photovoltaic cell units comprising a photovoltaic cell; and
a first wireless power device configured to receive the power, the first wireless power device comprising a coil configured to provide a magnetic field to wirelessly transfer the power to a second wireless power device, the first wireless power device being configured to provide a combinational implementation of a maximum power point tracking of the one or more photovoltaic cell units and a power control of a load.

2. The wireless photovoltaic power system of claim 1, wherein the wireless photovoltaic power system comprises:
the second wireless power device configured to engage the magnetic field to generate the second power, the second wireless power device being configured to provide constant current constant voltage operations to control a battery charging.

3. The wireless photovoltaic power system of claim 2, wherein the first wireless power device or the second wireless power device is configured to perform burst mode operations while the maximum power point tracking is maintained in the wireless photovoltaic power system.

4. The wireless photovoltaic power system of claim 1, wherein the maximum power point tracking of the one or more photovoltaic cell units comprises switching a direction of a control by a controller of the first wireless power device to determine a maximal power point.

5. The wireless photovoltaic power system of claim 1, wherein the first wireless power device is configured to operate at bursts to improve power efficiency of the transfer of the power.

6. The wireless photovoltaic power system of claim 1, wherein the first wireless power device is configured to switch between burst operations and continuous operations based on a power state of the one or more photovoltaic cell units or a state of the second wireless power device.

7. The wireless photovoltaic power system of claim 1, wherein the second wireless power device is configured to initiate burst mode operations by sending a specific request to the first wireless power device.

8. The wireless photovoltaic power system of claim 7, wherein the request includes a burst length or a number of bursts.

9. The wireless photovoltaic power system of claim 1, wherein each of the one or more photovoltaic cell units comprises at least a capacitor configured to smooth out power generated by the corresponding photovoltaic cell.

10. The wireless photovoltaic power system of claim 1, wherein each of the one or more photovoltaic cell units comprises a switch configured to connect the one or more photovoltaic cell units to the first wireless power device.

11. The wireless photovoltaic power system of claim 1, wherein the one or more photovoltaic cell units are connected to the first wireless power device in parallel.

12. The wireless photovoltaic power system of claim 1, wherein each of the one or more photovoltaic cell units are separately connected to and controlled by a controller of the first wireless power device.

13. The wireless photovoltaic power system of claim 1, wherein the first wireless power device is configured to couple the one or more photovoltaic cell units directly to one or more power consuming devices via a switch.

14. The wireless photovoltaic power system of claim 1, wherein the first wireless power device is configured to operate in a receiver mode.

* * * * *

UNITED STATES PATENT AND TRADEMARK OFFICE
CERTIFICATE OF CORRECTION

PATENT NO. : 11,557,916 B2
APPLICATION NO. : 17/542707
DATED : January 17, 2023
INVENTOR(S) : Itay Sherman et al.

It is certified that error appears in the above-identified patent and that said Letters Patent is hereby corrected as shown below:

On the Title Page

Item (71), under "Applicant", in Column 1, Line 2, delete "LTD," and insert -- LTD., --, therefor.

In the Drawings

In Fig. 2, Sheet 2 of 6, for Tag "250", in Line 1, delete "ANCILLIARY" and insert -- ANCILLARY --, therefor.

In Fig. 4, Sheet 4 of 6, for Tag "420", in Line 2, delete "DESCREASE" and insert -- DECREASE --, therefor.

In Fig. 6, Sheet 6 of 6, for Tag "606", in Line 1, delete "COMUNICTIONS" and insert -- COMMUNICATIONS --, therefor.

In the Specification

In Column 1, Line 56, delete "forgoing" and insert -- foregoing --, therefor.

In Column 2, Line 38, delete "referred" and insert -- referred to --, therefor.

In Column 3, Line 65, delete "others" and insert -- other --, therefor.

In Column 4, Line 21, delete "describe" and insert -- described --, therefor.

In Column 4, Line 45, delete "optimize" and insert -- optimized --, therefor.

In Column 4, Line 62, delete "(as both" and insert -- as both --, therefor.

In Column 6, Line 59, delete "reach," and insert -- reached, --, therefor.

Signed and Sealed this
Sixth Day of June, 2023

*Katherine Kelly Vidal*
Katherine Kelly Vidal
*Director of the United States Patent and Trademark Office*

CERTIFICATE OF CORRECTION (continued)
U.S. Pat. No. 11,557,916 B2

In Column 7, Line 41, delete "increase on" and insert -- increase in --, therefor.

In Column 8, Line 42, delete "is be" and insert -- that is to be --, therefor.

In Column 8, Line 62, delete "IN" and insert -- In --, therefor.

In Column 9, Line 16, delete "consumption" and insert -- consortium --, therefor.

In Column 9, Line 30, delete "can being" and insert -- can --, therefor.

In Column 9, Line 60, delete "charge" and insert -- charge is --, therefor.

In Column 10, Line 24, delete "were" and insert -- where --, therefor.

In Column 11, Line 1, delete "accordingly." and insert -- accordingly, --, therefor.

In Column 11, Line 11, delete "were" and insert -- where --, therefor.

In Column 11, Line 47, delete "engagement" and insert -- engagement is --, therefor.

In Column 13, Line 44, delete "couple" and insert -- configured to couple --, therefor.